US011969700B2

(12) United States Patent
Erb et al.

(10) Patent No.: US 11,969,700 B2
(45) Date of Patent: Apr. 30, 2024

(54) MIXING APPARATUS, MIXING SYSTEM AND METHOD FOR MIXING SUBSTANCES IN CLOSED CONTAINERS

(71) Applicant: TECAN TRADING AG, Mannedorf (CH)

(72) Inventors: Dominic Erb, Winterthur (CH); Philipp Riedel, Zurich (CH); Christian Strebel, Nanikon (CH); Gero Fehr, Lachen (CH); Klaus Lun, Pfaffikon SZ (IT); Christoph Karthaus, Jona (CH)

(73) Assignee: TECAN TRADING AG, Mannedorf (CH)

( * ) Notice: Subject to any disclaimer, the term of this patent is extended or adjusted under 35 U.S.C. 154(b) by 585 days.

(21) Appl. No.: 17/261,325

(22) PCT Filed: Jul. 24, 2019

(86) PCT No.: PCT/EP2019/069871

§ 371 (c)(1),
(2) Date: Jan. 19, 2021

(87) PCT Pub. No.: WO2020/020923

PCT Pub. Date: Jan. 30, 2020

(65) Prior Publication Data

US 2021/0260541 A1 Aug. 26, 2021

(30) Foreign Application Priority Data

Jul. 25, 2018 (EP) .................................... 18185420

(51) Int. Cl.
*B01F 31/23* (2022.01)
*B01F 31/20* (2022.01)
(Continued)

(52) U.S. Cl.
CPC ............ *B01F 31/23* (2022.01); *B01F 31/201* (2022.01); *B01F 35/221422* (2022.01); *B01F 35/325* (2022.01); *B01F 2101/23* (2022.01)

(58) Field of Classification Search
CPC ......... B01F 31/23; B01F 31/20; B01F 31/201
(Continued)

(56) References Cited

U.S. PATENT DOCUMENTS 5,578,268 A * 11/1996 Champseix ........... B01F 29/321 422/65
5,918,979 A * 7/1999 Martin .................... B01F 31/25 366/214
(Continued)

FOREIGN PATENT DOCUMENTS

WO WO2017081411 A1 5/2017

OTHER PUBLICATIONS

International Search Report for corresponding PCT application No. PCT/EP2019/069871, dated Oct. 25, 2019.

*Primary Examiner* — Marc C Howell
(74) *Attorney, Agent, or Firm* — Notaro, Michalos & Zaccaria P.C.

(57) ABSTRACT

A mixing apparatus containing a drive unit having a drive and a shaft that is pivotable about a pivot axis and is operatively connected to the drive. A pivotable receptacle is arranged on the shaft, where the pivot axis is oriented essentially horizontally, and the pivotable receptacle has a base plate and at least one retainer spaced therefrom, and the pivotable receptacle is configured in such a way that holders for containers can be inserted between the base plate and the at least one retainer in the direction of the pivot axis.

18 Claims, 7 Drawing Sheets

(51) Int. Cl.
*B01F 35/221* (2022.01)
*B01F 35/32* (2022.01)
*B01F 101/23* (2022.01)

(58) Field of Classification Search
USPC .......................................................... 366/210
See application file for complete search history.

(56) References Cited

U.S. PATENT DOCUMENTS

| | | | | |
|---|---|---|---|---|
| 9,776,188 | B1 * | 10/2017 | Kamees | B01L 9/50 |
| 10,967,341 | B2 * | 4/2021 | Stiver | B01F 23/53 |
| 2010/0064826 | A1 * | 3/2010 | Champseix | G01N 35/1079<br>422/65 |

* cited by examiner

MIXING APPARATUS, MIXING SYSTEM AND METHOD FOR MIXING SUBSTANCES IN CLOSED CONTAINERS

FIELD OF THE INVENTION

The present invention relates to a mixing apparatus, in particular for mixing substances in closed containers.

PRIOR ART

Prior-art mixing apparatuses are known in which, for example, ampoules can be arranged on a swivel table which can be pivoted by means of a drive. The swivel table comprises individual specific holders for ampoules with different diameters or the swivel table comprises a pattern of fingers which protrude from the tabletop of the swivel table and between which different ampoules can be arranged, wherein smaller ampoules roll back and forth between the fingers when pivoted.

In another well-known mixing apparatus, a holder for ampoules is mounted on two sides so that it can be rotated on both sides, wherein the holder can be pivoted by means of a drive. One ampoule can be inserted in each container receptacle of the holder.

With such mixing apparatuses there is a risk that the ampoules are mixed up before or during insertion into the holder or that the ampoules are mixed up when removed from the holder. In addition, inserting and removing the ampoules is time-consuming.

DESCRIPTION OF THE INVENTION

It is an object of the present invention to provide a mixing apparatus which the likelihood of a mix-up is reduced and in which the insertion and removal of containers containing substances to be mixed is facilitated. Especially with patient samples, a mix-up of the containers must be avoided.

This object is solved by the mixing apparatus with the features of claim 1. Further embodiments of the mixing apparatus, a mixing plant, as well as a method for the operation of a mixing apparatus or a mixing plant are defined by the features of further claims.

A mixing apparatus according to the invention comprises a drive unit having a drive and a shaft which is pivotable about a pivot axis and which is operatively connected to the drive, a pivotable receptacle which is arranged on the shaft, wherein the pivot axis is oriented substantially horizontally, wherein the pivotable receptacle comprises a base plate and at least one retainer spaced therefrom, wherein the pivotable receptacle is configured in such a way that holders for containers can be inserted in the direction of the pivot axis between the base plate and the at least one retainer. With such a design it is possible to insert the containers into the holder independently of the mixing apparatus, i.e., before they are inserted into the mixing apparatus. The insertion can therefore be carried out in a short time. In addition, the containers cannot be mixed up during insertion, as they can be placed in a holder without time pressure. The insertion of the holders with the containers in the direction of the pivot axis is very easy and ergonomic. The drive unit comprises a housing in which an electro-mechanical drive, with or without gear, is arranged. The drive unit can include a belt drive.

In one embodiment, the pivotable receptacle can be pivoted by any angle in both directions around the pivot axis. This means, for example, that the pivotable receptacle can be pivoted back and forth through any angle by means of the drive unit, or the pivotable receptacle can be rotated in one of the two directions of rotation once or several times around the pivot axis. This enables an optimal mixing of all possible substances which may be in the containers. Therefore, powders or fluids, such as suspensions or emulsions, can be mixed. For example, whole blood, i.e., blood plasma or blood serum, can be mixed with blood cells on their own or with additional substances. For example, the substances to be mixed can be filled into test tubes or ampoules. Ampoules comprise glass or plastic containers that are closed at the top with a lid that encloses a septum. The septum comprises a soft plastic, e.g., PTFE or silicone, which can be pierced with a pipette needle or tip. For example, such a lid can be screwed onto the open-top container with a thread.

In one embodiment, the mixing apparatus includes a control unit with which the pivoting angle, pivoting speed and pivoting direction can be adjusted. With the adjustment of these values an optimal mixing of the substances can be achieved.

In one embodiment, the side of the base plate facing the at least one retainer is provided with receptacles which are aligned in the direction of the pivot axis and into which the holders for containers can be inserted.

In one embodiment, the receptacles include elevations which can protrude into complementary recesses of the holders. For example, the elevations are elements that extend directly from the base plate of the pivotable receptacle. The protrusions can be pins, for example pins with a circular cross-section. However, other cross-sections are also conceivable. The elevations can also be sliding blocks, for example for T-slots or dovetail grooves. Alternatively, the receptacles can include recesses into which complementary elevations of the holders can protrude, and which also form a pin-groove connection or a sliding-block-and-groove connection.

In one embodiment, several receptacles are arranged one after the other along the pivot axis. For example, the receptacles include first receptacles that are arranged in a region of the base plate close to the shaft and second receptacles that are arranged in a region of the base plate remote from the shaft. The holders can be inserted with a first end into the first receptacle and with a second end into the second receptacle. The position and orientation of each holder is thus clearly and reliably defined.

Between one of the first receptacles and a second receptacle aligned with it in the direction of the pivot axis, further receptacles aligned with it can be provided. The additional receptacles provide additional support for the holders or allow the insertion of shorter holders that do not extend over the entire length of the pivotable receptacle.

In one embodiment, several receptacles are arranged side by side in a direction transverse to the pivot axis. Thus, several identical or different holders can be inserted next to each other into the pivotable receptacle, allowing the contents of several containers to be mixed simultaneously. For example, the receptacles are arranged symmetrically in relation to the pivot axis.

In one embodiment, the mixing apparatus comprises first spacers which can be inserted into the receptacles and into which the holders for the containers can be inserted, and second spacers which are arranged between the receptacles and on which the holders for the containers can rest. The spacers increase the distance between the inserted holders and the base plate of the pivotable receptacle. This is advantageous if shorter vessels are to be inserted into the holders and the upper end of the inserted vessels should have essentially the same distance to the base plate as the longer vessels. By grading the thickness of the spacers, it is possible to achieve that the upper ends of the common vessels are essentially aligned with each other when they are in the mixing apparatus. Different spacers can be placed simultaneously on the pivotable receptacle, allowing different vessels to be placed simultaneously in the mixing apparatus with their upper ends substantially aligned.

In one embodiment, a drive plate is provided in a first end area of the base plate, which is aligned essentially perpendicular to the base plate and essentially perpendicular to the pivot axis and which connects the shaft to the base plate.

In one embodiment, the base plate is connected to the at least one retainer by the drive plate.

In one embodiment, a support element is provided in a second end area of the base plate opposite the first end area, which support element comprises a cylindrical jacket surface whose axis is congruent with the pivot axis.

In one embodiment, the base plate is connected to the at least one retainer by the support element.

In one embodiment, the support element comprises a plate which is essentially perpendicular to the base plate and the pivot axis.

In one embodiment, the support element includes a central opening and the base plate protrudes at least partially through the central opening.

In one embodiment, at least one connector is provided to connect the drive plate to the support element.

In one embodiment, the drive plate includes at least one groove to accommodate the at least one retainer. Alternatively, the drive plate can be provided with an elevation in which the at least one retainer is held or with which the at least one retainer is guided or clamped. For example, such elevations can be ribs or pins.

In one embodiment, the support element comprises at least one fixation for the attachment of the at least one retainer. Such a fixation may comprise an at least partially detachable element. For example, the fixation can be pivotable and may comprise a fixing element. Alternatively or in addition, the drive plate may also be provided with a fixation with which the at least one retainer can be detachably fixed.

In one embodiment, the mixing apparatus comprises a bearing unit having at least one roller on which the support element is rotatably mounted with the jacket surface. The bearing unit is located opposite the drive unit in relation to the pivotable receptacle. The support element is pivotably mounted in the bearing unit in alignment with the shaft. Due to the double-sided bearing of the pivotable receptacle, the corresponding bearings and the pivotable receptacle must be dimensioned to be less stable, which means that they require less space and less mass must be moved.

In one embodiment, the bearing unit comprises two or more rollers on which the support element is rotatably mounted with the jacket surface. At least one of the rollers can be spring-mounted. At least one of the rollers can be driven synchronously with the drive unit.

In one embodiment, the drive unit and the bearing unit are arranged on a common connecting plate. The connecting plate can be designed to be completely closed or it can include at least one recess in the area of the pivotable receptacle.

In one embodiment, the at least one retainer comprises at least one plate having at least one through-opening, wherein the through-openings are arranged in such a way that, when the holders are inserted, they are aligned with the container receptacles formed in the holders.

In one embodiment, the internal dimensions of the through-openings are smaller than the internal dimensions of the container receptacles of the insertable holders. The inner dimensions of the through-hole can also be smaller than the outer dimensions of the lid of the containers.

In one embodiment, the at least one retainer comprises a first plate and a second plate, wherein the distance between the base plate and the first plate is greater than that between the base plate and the second plate. The two plates can be independent of each other or can be connected to each other.

In one embodiment, the first plate and the second plate are formed together as one piece.

In one embodiment, at least one tab is formed together in one piece and essentially flush with the at least one plate.

In one embodiment, at least one rib is integrally formed together with the at least one plate, which extends along the pivot axis over at least a portion of the at least one plate. The at least one rib may be formed in one or both lateral edge areas of each plate. Alternatively or additionally, ribs may be located between the two edge areas of each plate.

In one embodiment, at least one flap is formed jointly in one piece with the at least one rib and is formed spaced from and parallel to the at least one plate. The at least one tab may be located in one or both of the two free ends of the retainer.

In one embodiment, the mixing apparatus comprises at least one encoder with which the position of the pivotable receptacle can be determined.

In one embodiment, the mixing apparatus comprises at least one locking device with which the position of the pivotable receptacle can be fixed.

In one embodiment, the mixing apparatus comprises at least one holder for containers, which is inserted between the base plate and the at least one retainer. The at least one holder can be additionally inserted into the receptacles.

In one embodiment, each holder comprises several container receptacles arranged along a longitudinal axis, which are formed between the two ends. The container receptacles can, for example, be counterbores with a circular cross-section. Other cross-sections are also possible. Each container receptacle can comprise at least one lateral opening, which extends laterally outwards from the respective container receptacle transversely to the longitudinal axis. The at least one opening can be a slot or a window. Each container receptacle can have two lateral openings, which are arranged opposite each other with respect to the longitudinal axis and which together with the container receptacle form a passage in the holder. Each container receptacle can therefore be assigned one slot and one window, two slots or two windows. Each container receptacle or window of the holder can be provided with a clamping tab which protrudes through the window into the respective container receptacle, as a result of which a container accommodated therein can be held in a clampable manner. On the side of the holder that comprises the windows, there can be a tab plate on the holder that comprises all clamping tabs. Alternatively, the clamping tabs can be formed in one piece with the rest of the holder.

The mentioned embodiments of the mixing apparatus can be used in any combination, as long as they do not contradict each other.

A mixing plant according to the invention comprises a machine stand on which a mixing apparatus according to the invention is arranged.

The mixing plant can comprise a work surface, which is located on the machine stand and wherein the mixing apparatus is arranged on the work surface.

In one embodiment, the mixing system includes a pipetting unit with which fluids can be added or removed from containers in the mixing apparatus.

In one embodiment, the pipetting unit comprises a transport unit on which pipette tips are arranged and with which the pipette tips can be moved in the horizontal and/or vertical in an area above the machine stand or above the work surface.

In one embodiment, the mixing system comprises a reading unit with which markings can be read from the containers to be accommodated by the mixing apparatus. The markings can be selected from the group comprising ID barcode, 2D barcode, RFID tag and the like. The reading unit can also recognize markings that are placed on the holders for accommodating the containers. With the reading unit it is also possible to recognize in which position the container receptacle has accommodated a container and which position is empty. It can also be seen whether all holders for containers inserted into the mixing apparatus are fully inserted between the base plate and the retainer.

The aforementioned embodiments of the mixing plant can be used in any combination, as long as they do not contradict each other.

A method according to the invention for the operation of a mixing apparatus or a mixing plant, comprises the steps of providing a mixing apparatus in accordance with the invention;

inserting a holder with containers arranged therein into the receptacles of the pivotable receptacle; and pivoting the pivotable receptacle around the pivot axis with the drive unit.

The insertion can be an installation, for example if the pivotable receptacle includes cylindrical pins and the holder is provided with corresponding complementary holes. The insertion can also be a pushing in, for example, if the pivotable receptacle includes sliding blocks and the holder is provided with a corresponding complementary groove.

In one embodiment, the method comprises the steps of removing the retaining element before inserting the holder; and attaching the retaining element after inserting the holder.

For example, fastening elements can be removed which fix the retaining element in the corresponding receptacles, and the retaining element can then be lifted off and placed in a different location independent of the mixing apparatus. Alternatively, the retaining element can be pushed away linearly from the area above the pivotable receptacle by means of a sliding mechanism. In another alternative, the retaining element can be pivoted away from the area above the pivotable receptacle in one plane by means of a twisting mechanism. If the retaining element is fixed to the pivotable receptacle, the holder must be pushed into the pivotable receptacle under the retaining element, for example along the pivot axis.

In one embodiment, the method comprises the step of reading in of markings of containers arranged in a holder by means of the reading unit before or during the insertion of the holder. If the markings are read in during the insertion of the holder, each accommodated container can be assigned to a certain position in the holder and accordingly in the pivotable receptacle or in the mixing apparatus. If the reading in is to be carried out during the insertion, the holder must be inserted into the pivotable receptacle. If the reading in is carried out before insertion, it is necessary to ensure that the holder is inserted correctly. To prevent incorrect insertion, the first and second receptacles of the pivotable receptacle and, accordingly, the first and second ends of the holder can be designed differently. In addition, markings can be read in which are applied to the holders.

In one embodiment, the method comprises the steps of removing fluids from the containers disposed in the mixing apparatus after pivoting the pivotable receptacle;

feeding fluids into the containers disposed in the mixing apparatus before pivoting the pivotable receptacle.

For example, the contents of a mother tube containing, for example, whole blood can be mixed on its own or with additional substances. After mixing, a portion of the whole blood can be pipetted from the mother tube to a daughter tube. The daughter tube may be empty or may contain a substance, such as a reagent. Afterwards, the contents of the daughter tube can be mixed again. After mixing, the holder with its containers can be removed from the mixing apparatus and transferred to an analyzer. For the withdrawal and/or addition of fluids from containers which are closed by a lid which comprises a septum, it is necessary to pierce the septum, for example with a pipette needle.

The aforementioned embodiments of the method can be used in any combination, as long as they do not contradict each other.

BRIEF DESCRIPTION OF THE FIGURES

Exemplary embodiments of the present invention are explained in more detail below using the figures. These serve only for explanation and are not to be interpreted restrictively, wherein.

DETAILED DESCRIPTION OF THE INVENTION

Figure 1:
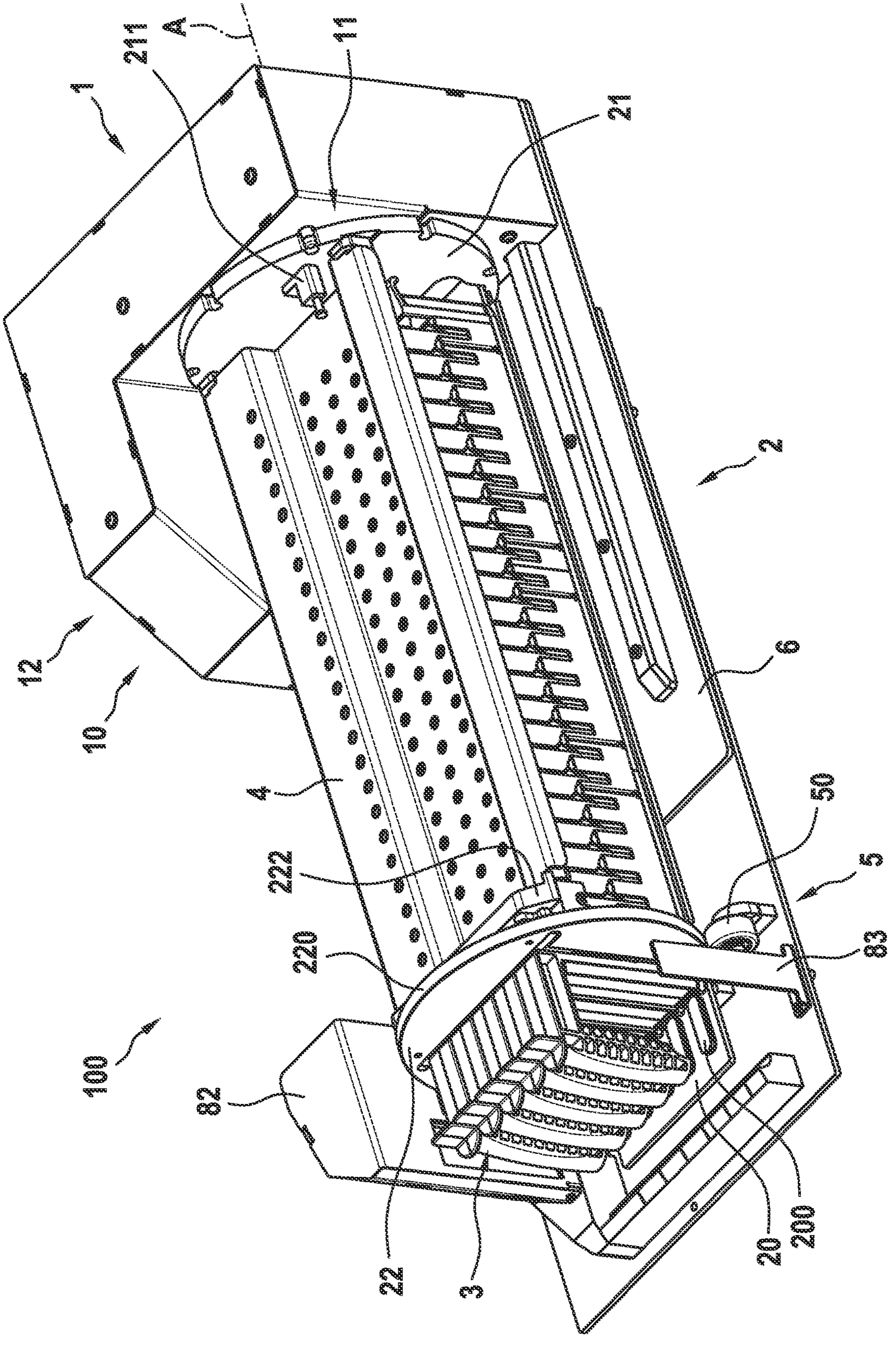
FIG. 1 shows a perspective view of a mixing apparatus according to the invention.

FIG. 1 shows a perspective view of a mixing apparatus 100 according to the invention. The mixing apparatus 100 comprises a drive unit 1 having a drive 10, a control unit 12 and a shaft 11 which can be pivoted about an essentially horizontal pivot axis A and is operatively connected to the drive 10. Furthermore, the mixing apparatus 100 comprises a pivotable receptacle 2, which is arranged on the shaft 11. The pivotable receptacle 2 comprises a base plate 20 and a retainer 4 spaced apart therefrom, wherein the pivotable receptacle 2 is designed in such a way that holders 3 for containers can be inserted between the base plate 20 and the retainer 4 in the direction of the pivot axis A. A circular disk-shaped drive plate 21 connects the shaft 11 to the base plate 20. The drive plate 21 is essentially perpendicular to the pivot axis A and essentially perpendicular to the base plate 20. At the end at the pivotable receptacle 2 opposite the drive plate 21, a circular disk-shaped support plate 22 is provided, which is aligned parallel and flush with the drive plate 21. The outside diameters of the two circular disks are essentially identical. The retainer 4, in this embodiment a retainer plate with holes, is detachably arranged between the drive plate 21 and the support plate 22. In the case of the drive plate 21, the retainer 4 can be fixed with a pivoting fixation 211 and in the case of the support plate 22 with a pivoting fixation 222. On the base plate 20, on the side facing the retainer 4, elevations 200 in the form of sliding blocks are provided. On the side of the support plate 22 opposite the drive side, a reading unit 82 having a limiter 83 is provided. With the reading unit 82, markings on the holder 3 and/or on the containers arranged in the holder 3 can be read in. The support plate 22 is supported and rotatably mounted on two rollers 50 of a bearing unit 5. The drive unit 1, the bearing unit 5, the reading unit 82, and the limiter 83 are arranged on a common connecting plate 6.

Figure 2:
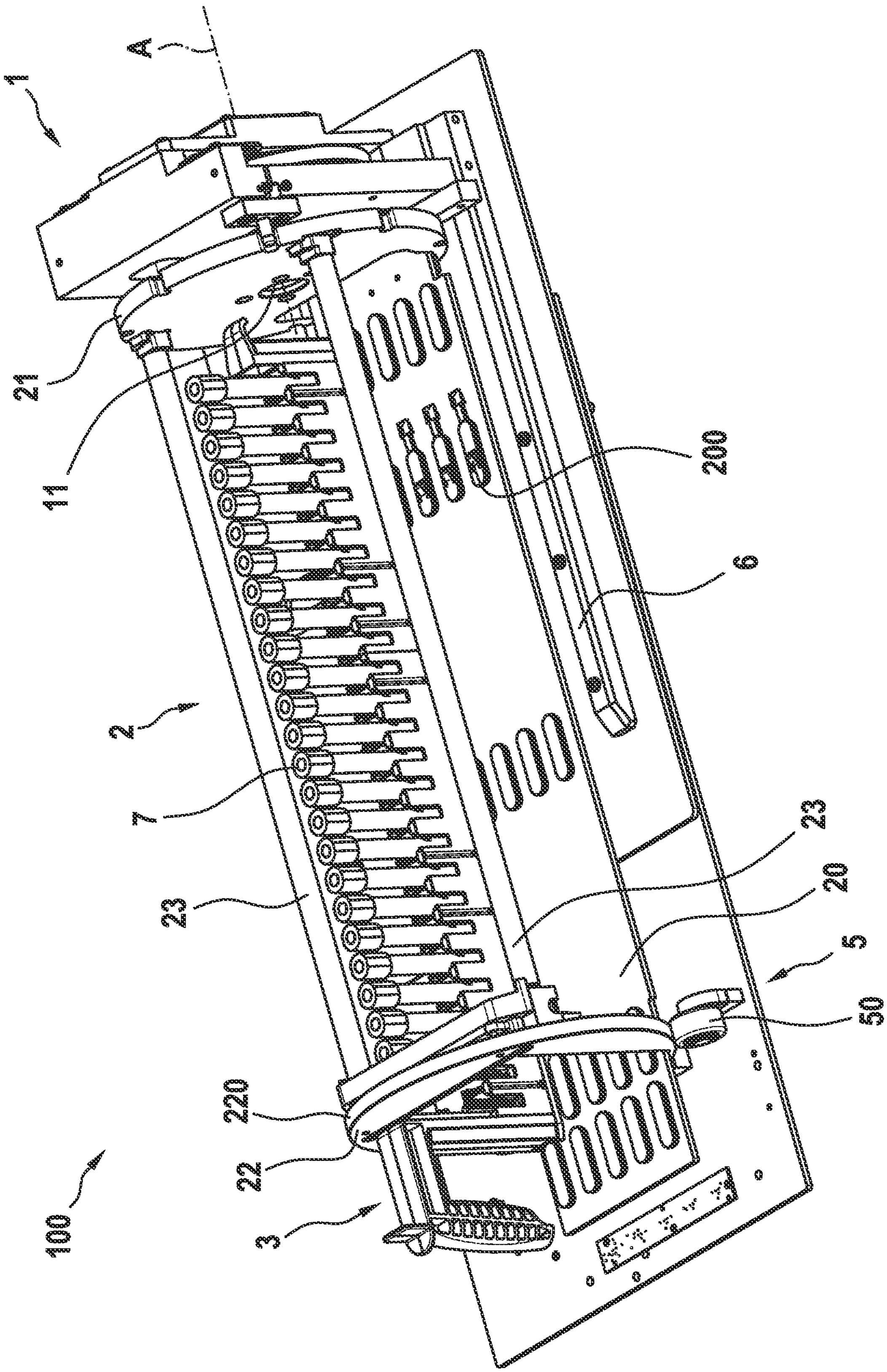
FIG. 2 shows the mixing apparatus of FIG. 1 without drive, without retainer and without reading unit.

FIG. 2 shows the mixing apparatus 100 of FIG. 1 without the housing and the drive 10 of drive unit 1, without the retainer 4, without the reading unit 82 and without the limiter 83. The drive plate 21 and the support plate 22 are connected by two rod-shaped connectors 23. The connectors 23 are designed and arranged in such a way that the retainer 4 can rest evenly on both connectors 23 when installed. A pattern of T-sliding blocks 200 is arranged on the base plate 20 of the pivotable receptacle 2. A double row of sliding blocks is arranged in both end areas of the base plate 20 and a single row in a central area of the base plate 20. Containers 7 are arranged in the inserted holder 3; shown are sample tubes with a pierceable lid, i.e. with a lid with a pierceable septum.

Figure 3A:
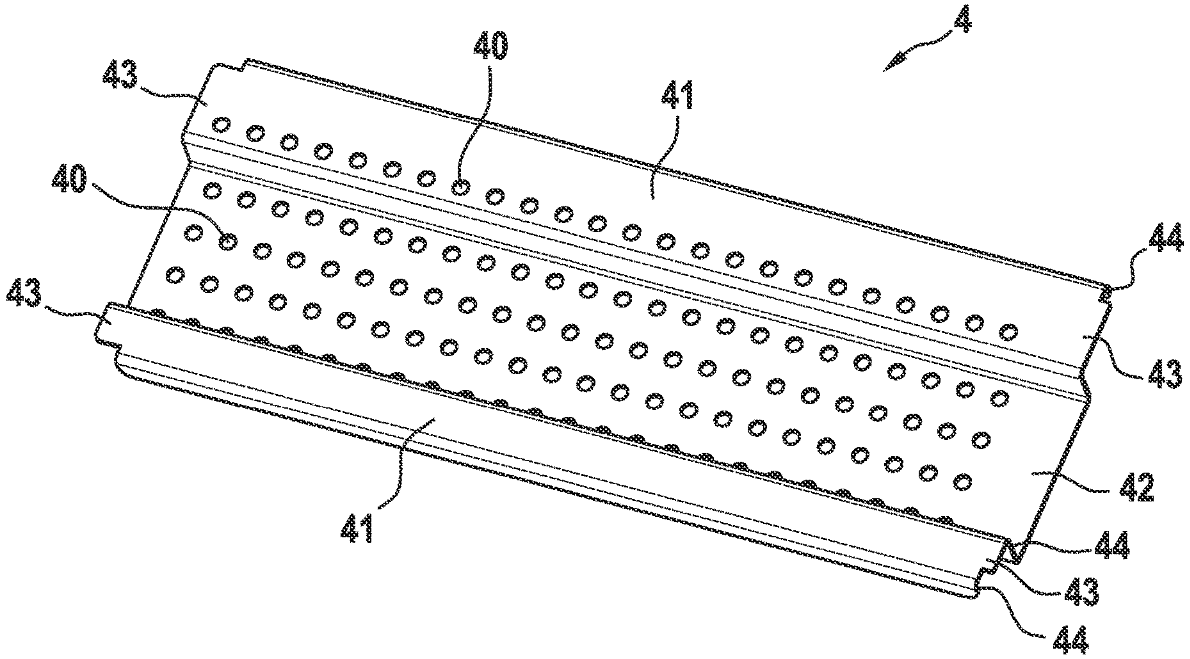
FIG. 3A shows the retainer of FIG. 1.

FIG. 3A shows the retainer 4 of FIG. 1. The retainer 4 comprises a bent plate with holes 40, with two first plates 41, or with two edge plates 41 and with a second plate 42, or with a central plate 42. The two edge plates 41 are flush with each other and the central plate 42 is parallel to the two edge plates 41. Continuous tabs 43 are provided at the two free ends of the retainer 4, which are formed flush with the corresponding plates. The ribs 44 extend essentially along the entire length of the retainer at the lateral outer boundary of the respective edge plate 41. Due to the integral design of the retainer 4, the offset of the first plate 41 to the second plate 42 forms a rib 44 in the respective transition area.

Figure 3B:
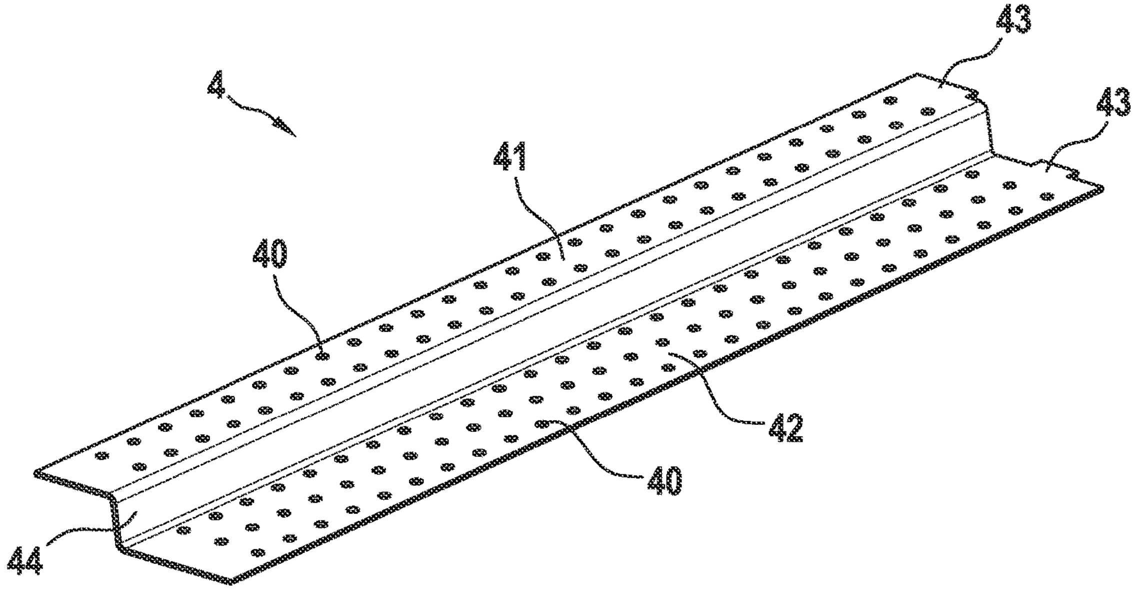
FIG. 3B shows an alternative embodiment of the retainer in FIG. 1.

FIG. 3B shows an alternative embodiment of the retainer 4 of FIG. 1 with only a first plate 41 and a second plate 42. In contrast to the retainer of FIG. 3A, mutually separated tabs 43 are provided, which are only located at one of the two free ends of the retainer. In this embodiment, only one rib 44 is formed in the transition area between the two plates 41, 42.

Figure 3C:
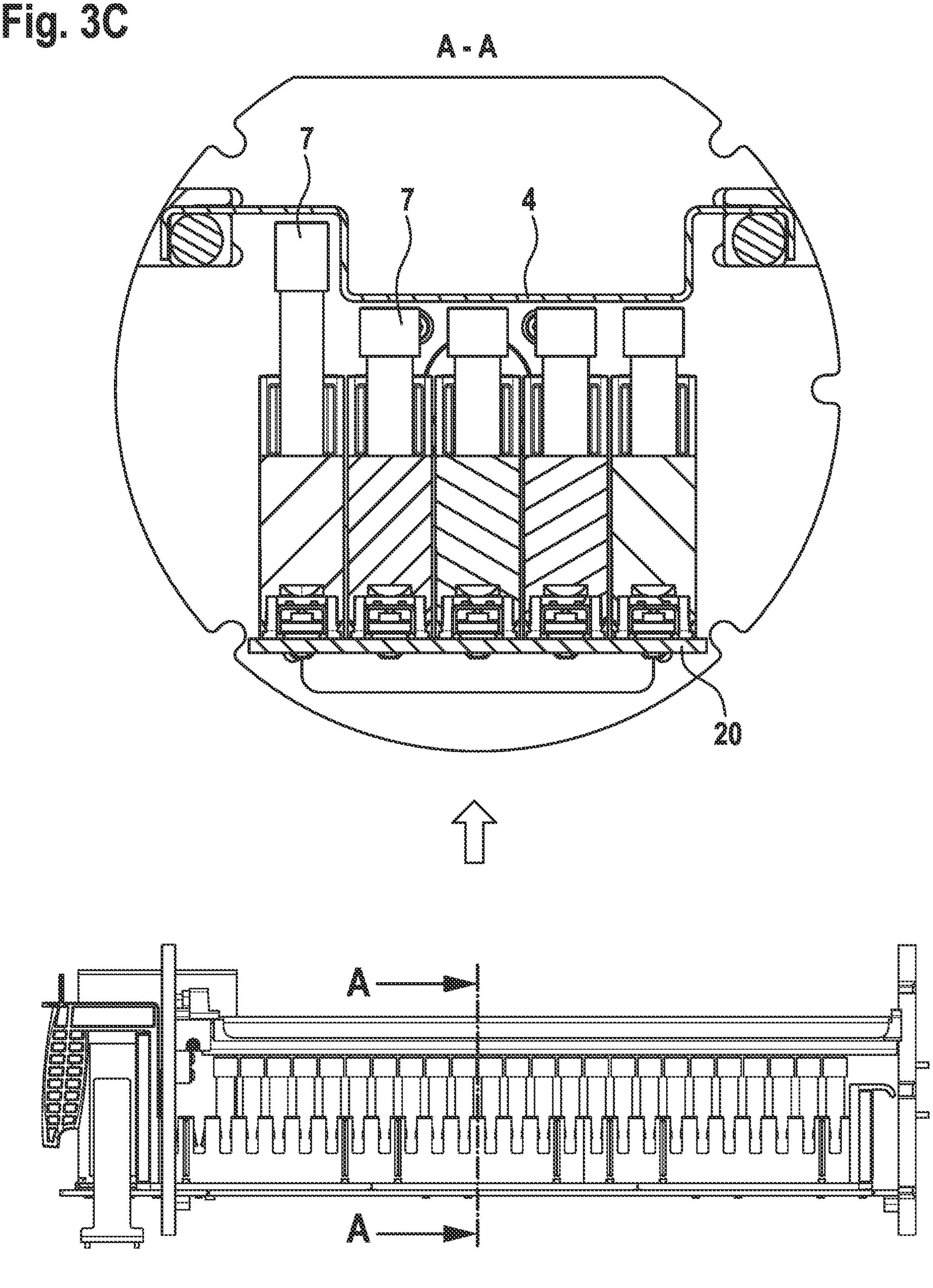
FIG. 3C shows a sectional view of the mixing apparatus of FIG. 1 across the axis, through a high and a low container.

FIG. 3C shows a sectional view of the mixing apparatus 100 of FIG. 1 transversely to axis A, through a high container 7 and through a low container 70. The high container 7 is inserted between the base plate 20 and the first plate 41 of the retainer 4 and the low container 70 is inserted between the base plate 20 and the second plate 42 of the retainer 4.

Figure 4:
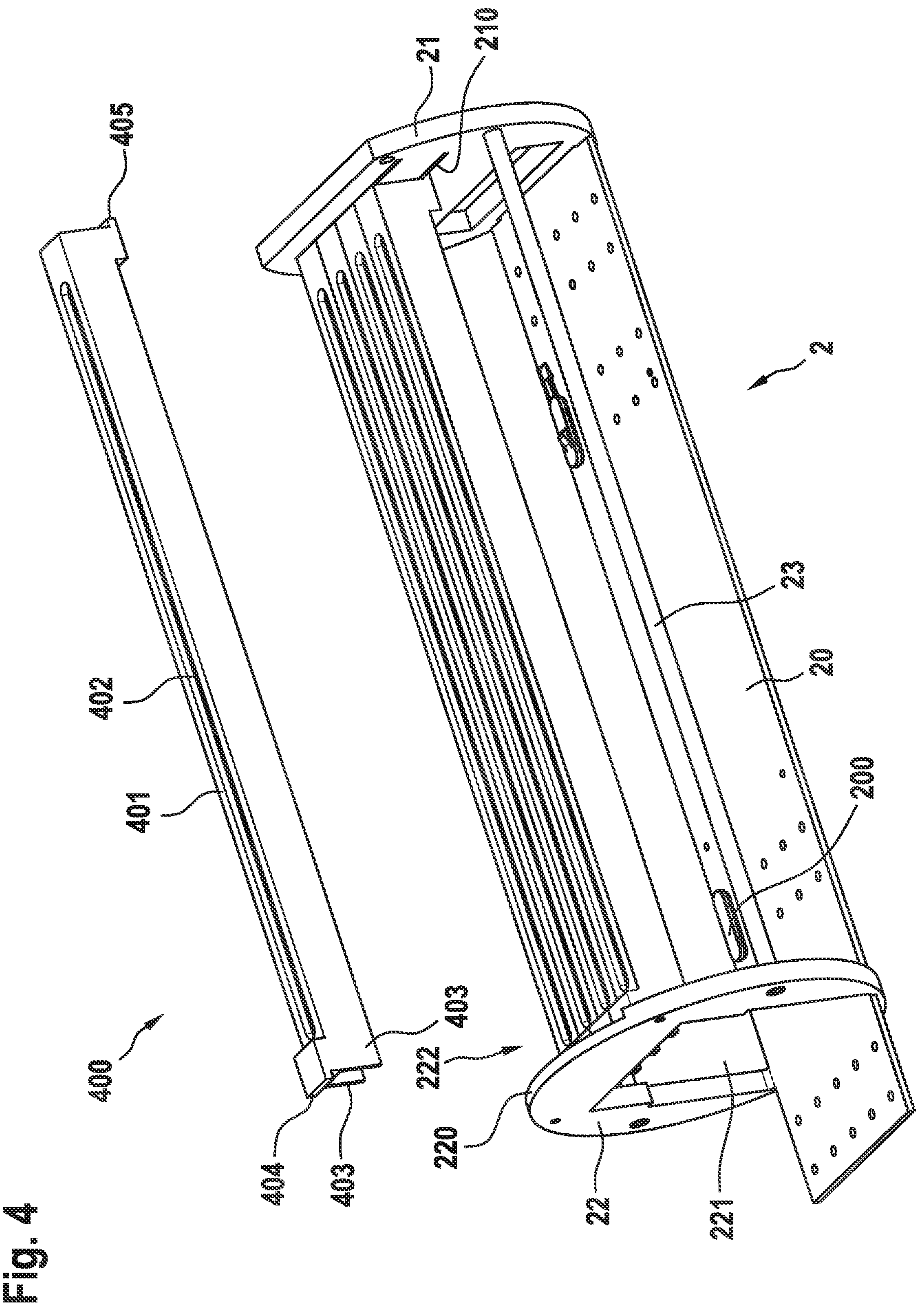
FIG. 4 shows a perspective view of a second embodiment of a pivotable receptacle having an alternative retainer.

FIG. 4 shows a perspective view of a second embodiment of a pivotable receptacle 2 having an alternative retainer 400. The drive plate 21 is provided with grooves 210 into which the retainers 400 can be inserted. The support plate 22 is provided with a fixation 222 with which the retainers 400 can be detachably attached. The connectors 23 are designed as laterally arranged round rods. A central opening 221 is provided in the support plate 22, through which the base plate 20 projects and through which the holders for containers can be inserted. In the illustrated variant of the pivotable receptacle 2, holders with high containers can be inserted into the retainers 400. If deeper containers are to be inserted, the retainers 400 must be rotated by 180 degrees in such a way that the outwardly directed surface of the plate 401 faces the base plate 20 and that the open end of the retainer 400 faces the drive plate 21.

Figure 5:
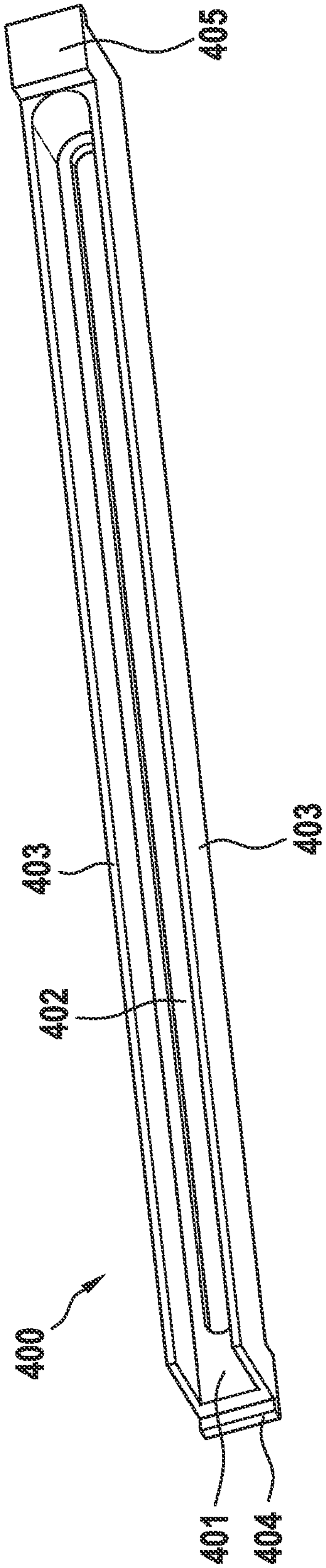
FIG. 5 shows a perspective bottom view of the retainer of FIG. 4.

FIG. 5 shows a perspective bottom view of the retainer 400 of FIG. 4. The retainer 400 comprises a plate 401 having a slot 402, which extends essentially over the entire length of the plate. The width of the slot 402 is smaller than the outer dimensions of the container closures and is larger than the piercing area of the container closures. In the two lateral edge areas of the retainer 400, ribs 403 extend over essentially the entire length of the retainer 400. A first free end of the retainer 400 is formed in an open manner and a second free end opposite the first free end is formed in a closed manner at the sides. At the open end of the retainer 400, a first tab 404 is provided which is designed parallel and slightly offset to the plate 401 in the area of the plate 401 and protrudes beyond the first free end of the retainer 400. At the closed end of the retainer 400, a second tab 405 is provided, which is designed parallel and slightly offset to the ribs 403 in the area of the ribs and protrudes beyond the second free end of the retainer 400.

Figure 6:
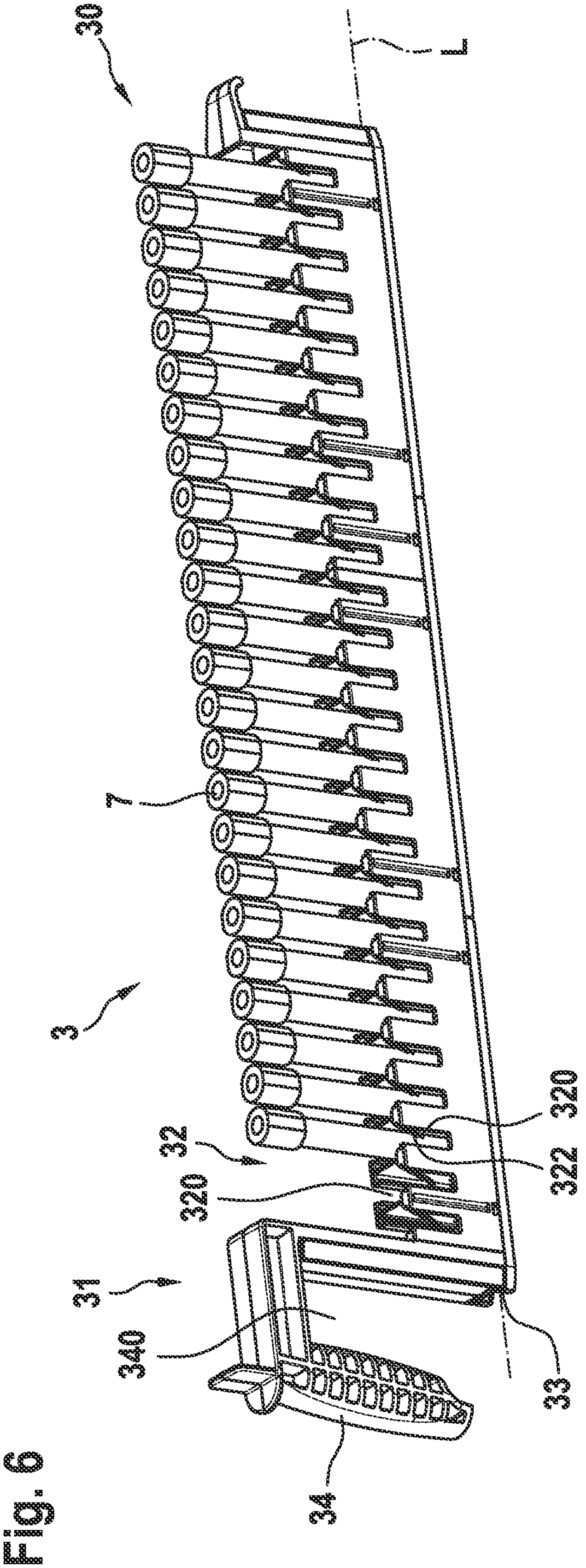
FIG. 6 shows a holder with containers inserted therein as in FIG. 2.

FIG. 6 shows a holder with containers inserted therein as in FIG. 2. The holder 3 extends along the longitudinal axis L, has container receptacles 32, which comprise two lateral slots 320, and has clamping tabs 322, which are formed integrally with the rest of the holder 3 and which project into the interior of the container receptacles 32. In addition, the holder 3 has a groove 33, which is located on the underside of the holder 3, i.e. on the side of the holder 3 opposite the container receptacles 32, A T-slot is shown. Alternatively, a dovetail groove or another retention grove can be provided. The groove 33 extends along the longitudinal axis L, at least over the area of the holder 3, which includes the container receptacles 32. The groove 33 is open at the first end 30 of the holder 3 so that the elevations 200 of the pivotable receptacle 2 can he easily moved into the groove 33. On the second side 31 of the holder 3, there is a handle 34 with which the holder 3 can be easily gripped by hand. A recess 340 is provided in the handle 34, which allows the reading unit 82 to recognize that the holder 3 is completely inserted into the pivotable receptacle 2.

Figure 7:
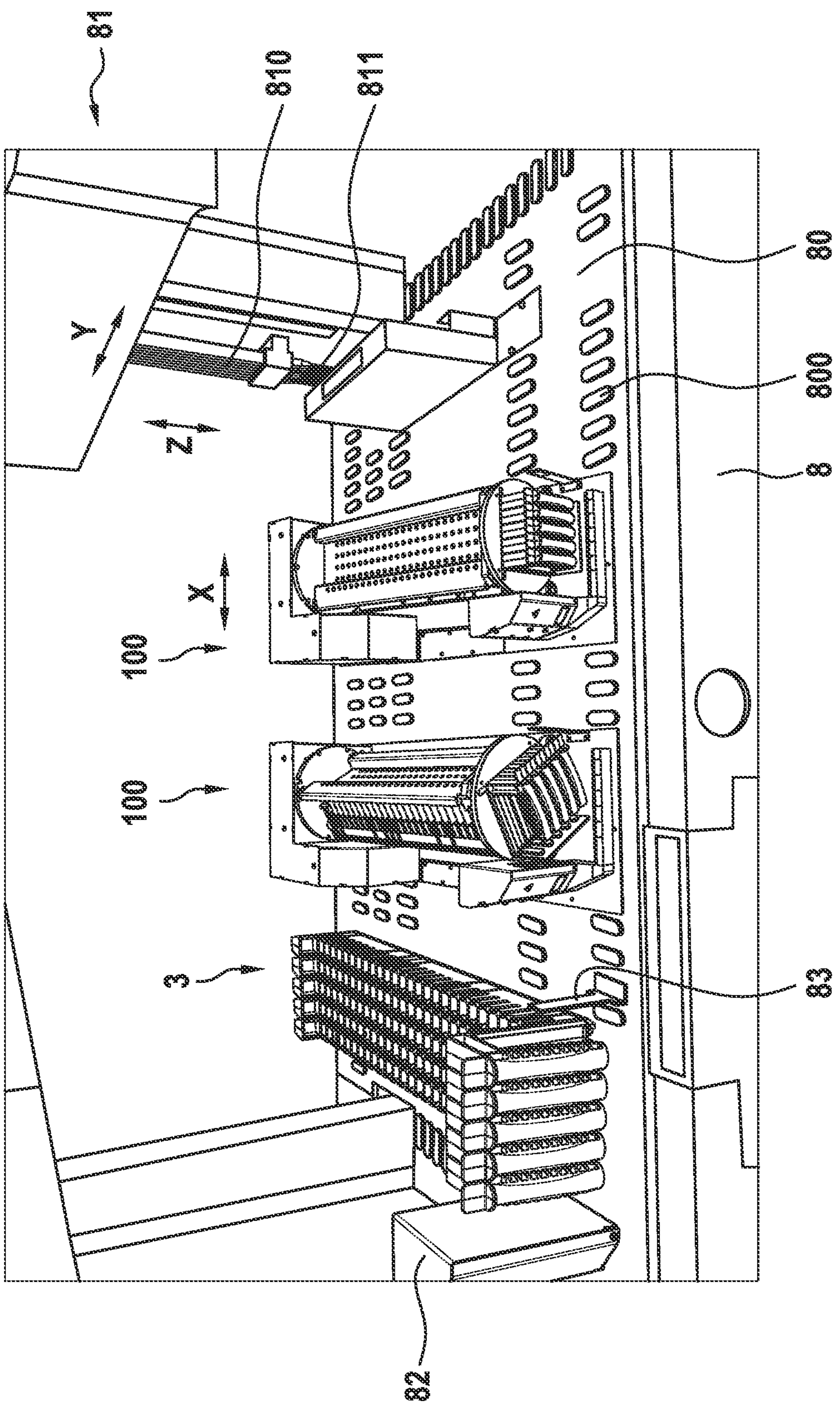
FIG. 7 shows a mixing plant according to the invention.

FIG. 7 shows a perspective view of a mixing plant having a mixing apparatus 100 according to the invention which is oriented in a pivoted manner and a non-pivoted mixing apparatus 100. Both apparatuses are arranged on the working surface 80 with receptacle elements 800, which are arranged on the machine stand 8. The mixing unit further comprises the pipetting unit 81 with the transport unit 810 and the pipette tips 811, The transport unit 810 can move the pipette tips 811 above the working surface 80 in a first horizontal direction X, in a second horizontal direction Y and in a vertical direction 3. In contrast to the embodiment of the mixing apparatus 100 in FIG. 1, the reading unit 82 and the limiter 83 are arranged next to the mixing apparatuses 100 on the working surface 80. The reading unit 82 is also aligned and fastened to the receptacle elements 800 on working surface 80. In front of the reading unit 82, holders can be pushed over the receptacle elements 800 in order to recognize the markings on the holders 3 and/or on the containers arranged in the holders 3.

List of Reference Numerals

1 Drive unit
10 Drive

11 Shaft
12 Control unit
100 Mixing apparatus
2 Pivotable receptacle
20 Base plate
200 Elevation
21 Drive plate
210 Groove
211 Fixation
22 Support plate
220 Jacket surface
221 Opening
222 Fixation
23 Connector
3 Holder
30 First end
31 Second end
32 Container receptacle
320 Slot
322 Clamping tab
33 Groove
34 Handle
340 Recess
4 Retainer
40 Hole
41 First plate
42 Second plate
43 Tab
44 Rib
400 Retainer
401 Plate
402 Slot
403 Rib
404 First tab
405 Second tab
5 Bearing unit
50 Roller
6 Connecting plate
7 Container
70 Container
8 Machine stand
80 Working surface
800 Receptacle element
81 Pipetting unit
810 Transport unit
811 Pipette tip
82 Reading unit
83 Limiter
A Pivot axis
L Longitudinal axis

The invention claimed is:

1. A mixing apparatus (100), comprising:

a drive unit (1) having a drive (10) and a shaft (11) which is pivotable about an essentially horizontally aligned pivot axis (A) and is operatively connected to the drive (10), a pivotable receptacle (2), which is arranged on the shaft (11), wherein the pivotable receptacle (2) comprises a base plate (20) and at least one retainer (4,400) spaced therefrom, wherein the pivotable receptacle (2) is configured in such a way that holders (3) for containers (7,70) can be inserted between the base plate (20) and the at least one retainer (4,400) in the direction of the pivot axis (A), wherein a drive plate (21) is provided in a first end area of the base plate (20), which is aligned essentially perpendicularly to the base plate (20) and to the pivot axis (A) and which connects the shaft (11) to the base plate (20), characterized in that a support element (22) is provided in a second end region of the base plate (20) opposite the first end region, which support element (22) comprises a cylindrical jacket surface (220), the axis of which is congruent with the pivot axis (A), and in that a bearing unit (5) is provided that has at least one roller (50) on which the support element (22) with the jacket surface (220) is rotatably mounted.

2. The mixing apparatus (100) according to claim 1, comprising a control unit (12) with which the pivoting angle, the pivoting speed and the pivoting direction can be adjusted, wherein the pivotable receptacle (2) can be pivoted through any angle in both directions about the pivot axis (A).

3. The mixing apparatus (100) according to claim 1, wherein on the side of the base plate (2) facing the at least one retainer (4,400), receptacles (200) are provided which are aligned in the direction of the pivot axis (A) and into which the holders (3) for containers (7) can be inserted.

4. The mixing apparatus (100) according to claim 1, wherein the base plate (20) is connected to the at least one retainer (4,400) by the drive plate (21).

5. The mixing apparatus (100) according to claim 1, wherein the base plate (20) is connected to the at least one retainer (4,400) by the support element (22) wherein the support element (22) comprises a plate which is aligned essentially perpendicularly to the base plate (20) and the pivot axis (A), wherein the support element (22) comprises a central opening (221) and wherein the base plate (20) projects at least partially through the central opening (221).

6. The mixing apparatus (100) according to claim 1, wherein at least one connector (23) is provided which connects the drive plate (21) to the support element (22).

7. The mixing apparatus (100) according to claim 1, wherein the drive plate (21) comprises at least one groove (210) for accommodating the at least one retainer (4,400).

8. The mixing apparatus (100) according to claim 1, wherein the support element (22) comprises at least one fixation (222) for fixing the at least one retainer (4,400).

9. The mixing apparatus (100) according to claim 1, wherein the bearing unit (5) comprises two or more rollers (50) on which the support element (22) with the jacket surface (220) is rotatably mounted.

10. The mixing apparatus (100) according to claim 1, wherein the drive unit (1) and the bearing unit (5) are arranged on a common connecting plate (6).

11. The mixing apparatus (100) according to claim 1, wherein the at least one retainer (4;400) comprises at least one plate (41;401,42) having at least one through-hole (40;402), wherein the through-holes (40;402) are arranged such that, when the holders (3) are inserted, the through-holes (40;402) are aligned flush with the container receptacles (32) formed in the holders (3).

12. The mixing apparatus (100) according to claim 1, wherein the at least one retainer (4) comprises a first plate (41) and a second plate (42), wherein the distance between the base plate (20) and the first plate (41) is greater than that between the base plate (20) and the second plate (42).

13. The mixing apparatus (100) according to claim 1, comprising at least one holder (3) for containers (7,70), which is inserted between the base plate (20) and the at least one retainer (4,400).

14. A mixing plant comprising:

a machine stand (8) on which a mixing apparatus (100) is arranged according to claim 1, the mixing plant further comprising a pipetting unit (81) with which fluids can be added to or removed from containers (7,70) located in the mixing apparatus (100), wherein the pipetting unit (81) comprises a transport unit (810), on which pipette tips (811) are arranged, and with which the pipette tips (811) are movable in the horizontal and/or in the vertical in a region above the machine stand (8) or above the working surface (80).

15. The mixing plant according to claim 14, comprising a reading unit (82) which is arranged on the machine stand (8) or on the connecting plate (6) of the mixing apparatus (100) and with which markings of the containers (7,70) to be accommodated in the mixing apparatus (100) can be read, and/or markings of the holders (3) to be accommodated in the mixing apparatus (100) can be read.

16. A method for operating a mixing apparatus (100) or mixing plant, comprising the steps of providing a mixing apparatus (100) according to claim 1;

inserting a holder (3) with containers (7, 70) arranged therein between the base plate (20) and the at least one retainer (4,400) in the direction of the pivot axis (A); and pivoting the pivotable receptacle (2) about the pivot axis (A) with the drive unit (1).

17. The method according to claim 16, comprising the step of reading in markings of a holder (3) and/or the containers (7,70) arranged in a holder (3) by means of the reading unit (82) before or during the insertion of the holder (3).

18. The method according to claim 16, comprising at least one of the following steps of removing fluids from the containers (7,70) located in the mixing apparatus (100) after pivoting the pivotable receptacle (2) by means of the pipetting unit (81);

feeding fluids into the containers (7,70) located in the mixing apparatus (100) before pivoting the pivotable receptacle (2) by means of the pipetting unit (81).

* * * * *